(12) United States Patent
Loera, Jr. et al.

(10) Patent No.: US 9,863,779 B2
(45) Date of Patent: Jan. 9, 2018

(54) POPULAR AND COMMON CHAIN POINTS OF INTEREST

(75) Inventors: Oscar Loera, Jr., Ricardson, TX (US); Michael Gene Surber, Dallas, TX (US); Craig Edward Cross, Madison Heights, MI (US); Marc Brian Ruskin, Commerce Township, MI (US)

(73) Assignee: Navigation Solutions, LLC, Plano, TX (US)

( * ) Notice: Subject to any disclaimer, the term of this patent is extended or adjusted under 35 U.S.C. 154(b) by 2115 days.

(21) Appl. No.: 11/695,261

(22) Filed: Apr. 2, 2007

(65) Prior Publication Data

US 2008/0243370 A1    Oct. 2, 2008

(51) Int. Cl.
*G01C 21/36* (2006.01)
*G06F 17/30* (2006.01)

(52) U.S. Cl.
CPC ....... *G01C 21/36* (2013.01); *G06F 17/30241* (2013.01)

(58) Field of Classification Search
CPC .......................... G01C 21/36; G06F 17/30241
USPC ....................................................... 701/201
See application file for complete search history.

(56) References Cited

U.S. PATENT DOCUMENTS

| | | | |
|---|---|---|---|
| 5,608,635 A | 3/1997 | Tamai | |
| 5,850,618 A | 12/1998 | Suetsugu et al. | |
| 6,278,940 B1 * | 8/2001 | Endo | 701/533 |
| 6,339,746 B1 | 1/2002 | Sugiyama et al. | |
| 6,360,167 B1 | 3/2002 | Millington et al. | |
| 6,385,535 B2 | 5/2002 | Ohishi et al. | |
| 6,401,034 B1 * | 6/2002 | Kaplan et al. | 701/416 |
| 6,526,335 B1 | 2/2003 | Treyz et al. | |
| 6,687,613 B2 * | 2/2004 | Yokota | 701/209 |
| 6,983,203 B1 * | 1/2006 | Wako | 701/208 |
| 7,082,365 B2 | 7/2006 | Sheha et al. | |
| 7,620,492 B2 * | 11/2009 | Friedrichs et al. | 701/537 |
| 8,041,568 B2 * | 10/2011 | Strope et al. | 704/257 |
| 2002/0183924 A1 | 12/2002 | Yokota | |
| 2003/0036848 A1 | 2/2003 | Sheha et al. | |
| 2003/0069690 A1 * | 4/2003 | Correia et al. | 701/211 |
| 2003/0225510 A1 | 12/2003 | Ono et al. | |
| 2005/0107949 A1 | 5/2005 | Yokota | |
| 2005/0107952 A1 | 5/2005 | Hoshino et al. | |
| 2005/0182561 A1 * | 8/2005 | Yamada et al. | 701/209 |
| 2006/0229807 A1 | 10/2006 | Sheha et al. | |
| 2007/0118284 A1 * | 5/2007 | Sposato et al. | 701/213 |
| 2007/0210155 A1 * | 9/2007 | Swartz et al. | 235/383 |
| 2008/0154488 A1 * | 6/2008 | Silva et al. | 701/201 |
| 2011/0047139 A1 * | 2/2011 | Strope et al. | 707/706 |

\* cited by examiner

*Primary Examiner* — Thomas G Black
*Assistant Examiner* — Sze-Hon Kong
(74) *Attorney, Agent, or Firm* — Carlson, Gaskey & Olds, P.C.

(57) ABSTRACT

A navigation system includes an improved interface for accessing points of interest. Popular chains and franchises are accessible via a separate search, which can be accessed more efficiently and quickly. The list of popular chains can then be used to access the main database of points of interest.

7 Claims, 2 Drawing Sheets

POPULAR AND COMMON CHAIN POINTS OF INTEREST

BACKGROUND OF THE INVENTION

The present invention relates generally to navigation systems and more particularly to a navigation system having an improved interface for choosing points of interest.

Vehicle navigation systems generally include one or more sensors, such as a GPS sensor, indicating the present position of the vehicle relative to a map database of roads. The navigation system typically includes a database of points of interest to which the user can choose to be routed, such as restaurants, hotels, etc.

Currently in order to find a point of interest, the user may first select a category, such as "restaurants." The user may then further limit the search by choosing a city. The user then begins entering the first few letters of the name of the desired destination. As the user enters letters, only letters that are valid next characters are displayed on the screen for selection by the user. When the user has entered enough characters so that the list is a manageable length, a list of destinations meeting the search criteria is displayed to the user. The user then picks the desired destination from the list.

The current user interface has several potential drawbacks. First, sometimes the user is unsure to which point of interest category the desired destination belongs. Thus, the user may have to try more than one point of interest category, re-entering the name of the destination each time. Second, the user may be unsure of the correct spelling of the point of interest name.

SUMMARY OF THE INVENTION

In the navigation system according to one embodiment of the present invention, a user interface provides a "popular chains" category. When the popular chains category is selected, the user accesses a limited subset of the points of interest in the main points of interest database. Only large or commonly-used chains or franchises are included in the popular chains category. As a result, the user can much more quickly find a desired destination. The user does not need to know the points of interest category to which the destination belongs. The user may be able to skip entering the city of the destination. Further, the user need not type as many letters of the name of the points of interest in order to limit the list to a manageable size before choosing the destination on the list.

These and other features of the present invention can be best understood from the following specification and drawings, the following of which is a brief description.

DETAILED DESCRIPTION OF THE PREFERRED EMBODIMENT

Figures 1, 1A:
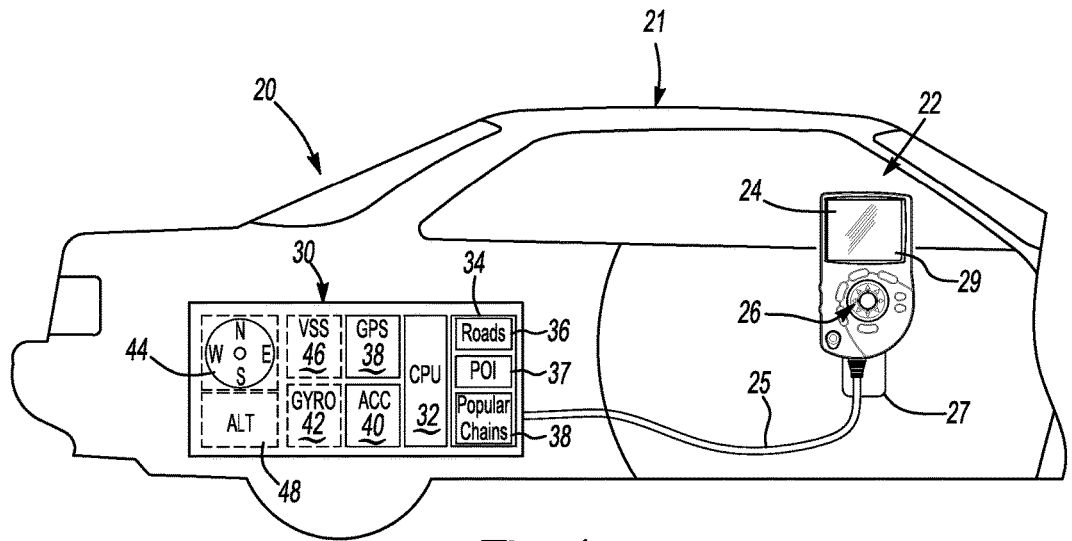
FIG. 1 schematically illustrates a navigation system according to one embodiment of the present invention installed in a vehicle.
FIG. 1A illustrates a portion of the popular chains database from FIG. 1.

A navigation system 20 according to one embodiment of the present invention is shown schematically in FIG. 1 installed in a vehicle 21. The navigation system 20 includes a user interface module 22 having a display 24 and a user input device 26. The user input device 26 can include a directional input device. Alternatively, the display 24 can be a touch screen display and/or voice recognition. The user interface module 22 further includes a speaker 29.

The user interface module 22 is connected either wirelessly or via cable 25 to the main module 30. The main module 30 includes a CPU 32 having a processor and memory, such as RAM or other electronic storage. The CPU 32 is programmed to perform the functions described herein. The CPU 32 is connected to storage 34, which could also be electronic storage, or a hard drive, cd-rom, dvd or any electronic, optical, magnetic or other storage device. Storage 34 includes a map database of roads 36 and a database of points of interest 37. The database of points of interest 37 includes at least the names, locations and categories (e.g. restaurant, hotel, etc.) of all the points of interest in a given area (e.g. North America). The storage 34 further includes a database of popular chains 38, which is a subset of the points of interest in database of points of interest 37. The entries in the database of popular chains 38 include only well known, common, popular, or otherwise selected chains or franchises from the database of points of interest 37. The databases 36, 37, 38 could each be in separate databases or the databases 36, 37, 38 could be contained in a single database.

The main module 30 further includes one or more sensors used by the CPU 32 to determine the present position of the vehicle 21 relative to the map database of roads 36. Some example sensors include: a GPS receiver 38, an accelerometer 40, a gyro 42, a compass 44, a vehicle speed sensor 46, and an altimeter 48. Any or all of these or other sensors could be used, as the present invention is independent of the specific underlying position-determination technology.

FIG. 1A schematically illustrates the contents of the database of popular chains 38. Each popular chain is a record 82 in the database of popular chains 38. Each record 82 includes at least three fields: name 84, exact search string 86, and point of interest category 88. The database of popular chains 38 can be stored in a simple comma separated value file. Each popular chain in the database of popular chains 38 corresponds to numerous records (i.e. locations) in the database of points of interest 37. The exact search string 86 field correlates its associated record 82 to a plurality of associated records in the database of popular chains 38, i.e. all of the locations of that particular chain.

Figure 2:
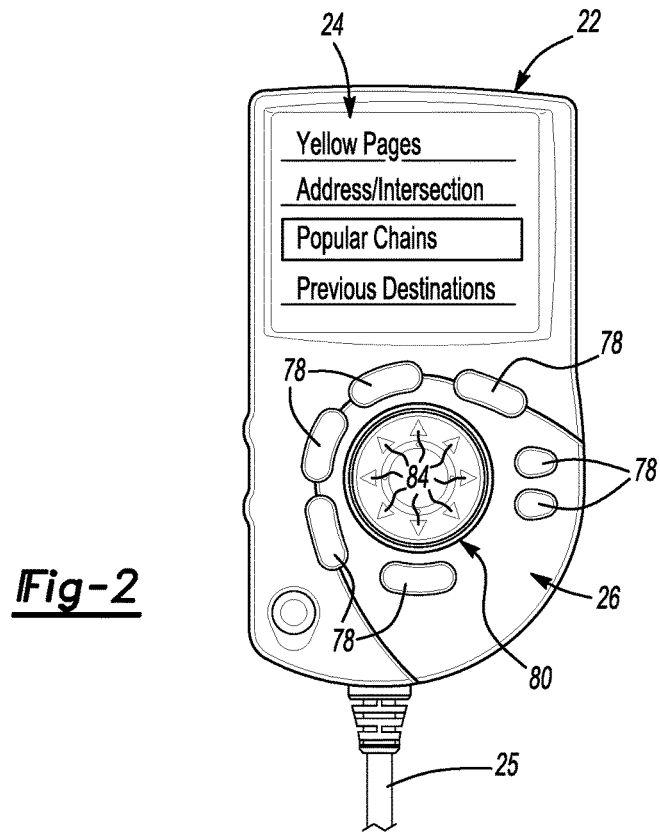
FIG. 2 is an enlarged view of the user interface module of FIG. 1.

FIG. 2 is an enlarged view of the user interface module 22 of FIG. 1. The user interface module 22 includes the display 24 and a user input device 26, which may include a plurality of buttons 78 and a directional input device 80. The display 24 in FIG. 2 illustrates a menu from which a method of choosing a destination is selected. For example, the user can choose to enter the address or intersection as the desired destination. Alternatively, the user can choose "yellow pages," which then provides the user with a list of categories of points of interest (restaurants, hotels, etc) from which the user can choose in the manner provided in the above-described prior art. In the present invention, the "popular chains" option can also be selected by the user using the directional input device 80. When "popular chains" is selected from the menu, the display 24 is changed to that in FIG. 3.

Figure 3:
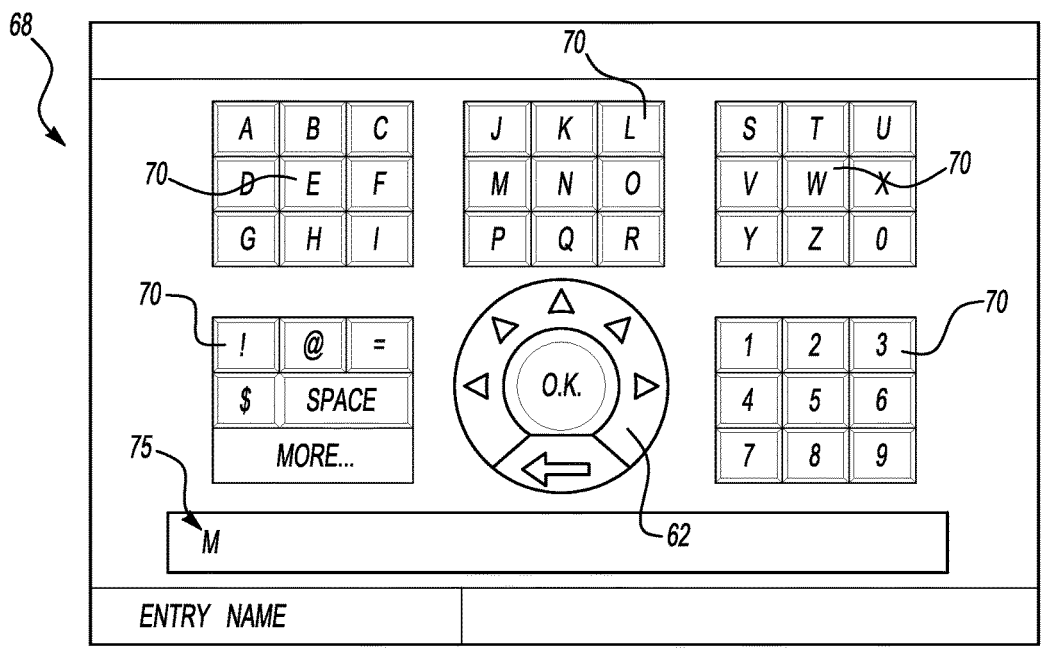
FIG. 3 shows a text entry screen to be displayed on the display of FIG. 2.

FIG. 3 illustrates a text entry screen to be displayed on the display 24 of the user interface module 22 (FIGS. 1 and 2). Using the user input device, the user selects characters 70 one at a time that are entered into the field 75. As each letter is added to the field 75, the CPU 32 (FIG. 1) performs a next-letter analysis of the database of popular chains 38 and grays out or otherwise makes unavailable any characters 70 that are not valid next-letters. This speeds text entry. Because the database of popular chains 38 is a small subset of the points of interest database 37, the next-letter analysis can be performed in real time on the fly. At any time, the user can hit "enter" on the user input device 26 (FIG. 2) and see a list of popular chains that match the text entered so far in the field 75 (if any). Alternatively, when the list of possible popular chains drops below a threshold, the screen automatically switches to a list of possible valid matches. Since the popular chains database 38 is significantly smaller than the points of interest database 37, this should occur much sooner than a search in the points of interest database 37.

Once a popular chain has been selected, i.e. a record 82 in the database of popular chains 38 has been selected, the associated search string 86 is used to access the entire points of interest database 37, which returns points of interest results that match the chain name search string 86 and associated category 88. Alternatively, the name field 84 could be used to access the points of interest database 37, but a dedicated search string is preferred. The search string 86 may alternatively be a code or unique characters for accessing the points of interest database 37. The associated POI category 88 in the record 82 in the database of popular chains 38 may be used in addition to the search string 86 to index the points of interest database 37 in order to ensure that only the desired points of interest are retrieved. Otherwise, unrelated points of interest in different categories sometimes have the same name, but it is unlikely or rare that unrelated points of interest in the same POI category would have the same name.

The returned points of interest results that match the search string 86 and points of interest category 88 are displayed in a list on the display 24. The matches may be displayed in order of geographic proximity to the current location of the vehicle 21 or proximity to a selected city (if one was selected). The user then can traverse the list of matching points of interest and select one of the listed points of interest.

In a known manner, the navigation system 20 then determines a route to the geographic location associated with the selected point of interest using the database of roads 36. The navigation system 20 may then generate turn by turn instructions to the driver via the display 24 and the speaker 29, while monitoring the current position of the vehicle 21 relative to the map database of roads 36.

The term "chain" refers to a plurality of points of interest that share a brand (name field 84), such that users would expect to find a certain level of quality of goods or services at locations with that brand. This includes locations that are all commonly owned and those that are operated under franchise agreements or other arrangements. The chain can be a local chain, regional chain, national chain or worldwide chain.

Although a preferred embodiment has been disclosed, a worker of ordinary skill in this art would recognize that certain modifications would come within the scope of the claims. For that reason, the following claims should be studied to determine their true scope and content.

What is claimed is:

1. A navigation system comprising:
   a user interface;
   a POI database containing points of interest, each record in the POI database having an associated POI name and geographic location;
   a chain database, each of a plurality of records in the chain database having an associated chain name, each of the plurality of records in the chain database associated with an associated subset of records in the POI database, and wherein said chain database is pre-loaded in the navigation system prior to an initial access by an end user.

2. The navigation system of claim 1 wherein the plurality of records in the chain database are each associated with a chain.

3. The navigation system of claim 1 wherein each of the plurality of records in the chain database further includes an associated search string that correlates the record in the chain database to the associated subset of records in the POI database.

4. The navigation system of claim 1 wherein the user interface is programmed to permit a user to find a desired record in the chain database and to use the desired record to find a desired associated record in the POI database.

5. The navigation system of claim 4 wherein the user interface is programmed to communicate navigation instructions to a geographic location associated with the desired associated record in the POI database.

6. The navigation system of claim 4 wherein the user interface includes a text entry interface for entering the chain name to choose the desired record from the chain database.

7. The navigation system of claim 6 further including at least one sensor for determining a present position of the navigation system relative to the associated geographic location of the desired associated record in the POI database.

* * * * *

UNITED STATES PATENT AND TRADEMARK OFFICE
CERTIFICATE OF CORRECTION

| | |
|---|---|
| PATENT NO. | : 9,863,779 B2 |
| APPLICATION NO. | : 11/695261 |
| DATED | : January 9, 2018 |
| INVENTOR(S) | : Oscar Loera, Jr. et al. |

It is certified that error appears in the above-identified patent and that said Letters Patent is hereby corrected as shown below:

On the Title Page

In item (75), Inventors, Line 1; replace "Ricardson, TX" with --Richardson, TX--

Signed and Sealed this
Twenty-fifth Day of September, 2018

Andrei Iancu
*Director of the United States Patent and Trademark Office*